US007203384B2

(12) United States Patent
Carl

(10) Patent No.: US 7,203,384 B2
(45) Date of Patent: Apr. 10, 2007

(54) IMPLEMENT FOR OPTICALLY INFERRING INFORMATION FROM A PLANAR JOTTING SURFACE

(75) Inventor: Stewart R. Carl, Palo Alto, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 754 days.

(21) Appl. No.: 10/640,942

(22) Filed: Aug. 13, 2003

(65) Prior Publication Data

US 2004/0164972 A1     Aug. 26, 2004

Related U.S. Application Data

(60) Provisional application No. 60/450,244, filed on Feb. 24, 2003.

(51) Int. Cl.
    *G06K 9/22*         (2006.01)
(52) U.S. Cl. .................. 382/314; 382/291; 382/188
(58) Field of Classification Search ................ 345/173, 345/175, 179; 382/116, 314, 186, 291, 188
    See application file for complete search history.

(56) References Cited

U.S. PATENT DOCUMENTS

| 4,070,649 | A | 1/1978 | Wright, Jr. et al. ......... 382/188 |
| 4,203,653 | A | 5/1980 | Mori .......................... 359/753 |
| 4,235,520 | A | 11/1980 | Kimura ....................... 359/757 |
| 4,257,678 | A | 3/1981 | Momiyama et al. ........ 359/746 |
| 4,471,162 | A | 9/1984 | Aono et al. ............... 178/18.07 |
| 4,896,543 | A | 1/1990 | Gullman ................ 73/862.041 |
| 4,975,546 | A * | 12/1990 | Craig ....................... 178/19.06 |
| 5,061,828 | A * | 10/1991 | Purcell ........................ 345/173 |

(Continued)

FOREIGN PATENT DOCUMENTS

EP          0649549 B1     12/1997

(Continued)

OTHER PUBLICATIONS

Ait-Aider et al., Model to Image Straight Line Matching Method for Vision-Based Indoor Mobile Robot Self-Location, IROS 2002, Lausanne, Sep. 30-Oct. 4.

(Continued)

*Primary Examiner*—Anh Hong Do
(74) *Attorney, Agent, or Firm*—Lumen Intellectual Property Services

(57) ABSTRACT

The present invention relates to a jotting implement that infers hand-jotted information from a jotting surface. The hand-jotted information is any information marked on the jotting surface as a result of writing, jotting, drawing, sketching or in any other manner of marking or depositing marks on the jotting surface. Hand-jotted information is also information traced on the jotting surface without leaving any markings thereon or otherwise produced by the motions executed by the jotting implement with respect to the jotting surface while in contact with the jotting surface. The jotting implement has a nib for jotting and an arrangement for determining when the nib is jotting on the jotting surface. Further, the implement has an optical unit for viewing the jotting surface. The implement also has a processing unit for receiving optical data of said jotting surface from the optical unit and determining from it the physical coordinates of the nib with respect to at least one corner of the jotting surface and at least one edge of the jotting surface and/or other landmarks or optically recognizable features on the jotting surface.

29 Claims, 14 Drawing Sheets

U.S. PATENT DOCUMENTS

| | | | |
|---|---|---|---|
| 5,103,486 A | 4/1992 | Grippi | 382/116 |
| 5,166,668 A | 11/1992 | Aoyagi | 345/180 |
| 5,215,397 A | 6/1993 | Taguchi et al. | 401/194 |
| 5,226,091 A | 7/1993 | Howell | 382/107 |
| 5,294,792 A | 3/1994 | Lewis et al. | 250/221 |
| 5,333,209 A | 7/1994 | Sinden et al. | 382/187 |
| 5,434,371 A | 7/1995 | Brooks | 178/19.04 |
| 5,477,012 A | 12/1995 | Sekendur | 178/18.09 |
| 5,484,966 A | 1/1996 | Segen | 178/18.09 |
| 5,517,579 A | 5/1996 | Baron et al. | 382/187 |
| 5,548,092 A | 8/1996 | Shriver | 178/19.01 |
| 5,577,135 A | 11/1996 | Grajski | 382/253 |
| 5,581,276 A | 12/1996 | Cipolla | 345/156 |
| 5,587,558 A | 12/1996 | Matsushima | 178/18.01 |
| 5,587,560 A | 12/1996 | Crooks | 178/18.03 |
| 5,652,412 A | 7/1997 | Lazzouni et al. | 178/18.01 |
| 5,661,506 A | 8/1997 | Lazzouni et al. | 345/179 |
| 5,717,168 A | 2/1998 | LeBuisser et al. | 178/18.04 |
| 5,737,740 A | 4/1998 | Henderson et al. | 715/530 |
| 5,750,939 A | 5/1998 | Makinwa et al. | 178/18.01 |
| 5,774,602 A | 6/1998 | Taguchi et al. | 382/314 |
| 5,781,661 A | 7/1998 | Hiraiwa et al. | 382/188 |
| 5,850,058 A | 12/1998 | Tano et al. | 178/18.01 |
| 5,852,434 A | 12/1998 | Sekendur | 345/179 |
| 5,902,968 A | 5/1999 | Sato et al. | 178/19.01 |
| 5,939,702 A | 8/1999 | Knighton et al. | 235/472.03 |
| 5,959,617 A | 9/1999 | Bird et al. | 345/182 |
| 5,960,124 A | 9/1999 | Taguchi et al. | 382/284 |
| 5,977,958 A | 11/1999 | Baron et al. | 345/179 |
| 5,981,884 A | 11/1999 | Sato et al. | 178/19.01 |
| 6,023,291 A | 2/2000 | Kamel et al. | 348/147 |
| 6,031,936 A | 2/2000 | Nakamura | 382/187 |
| 6,044,165 A | 3/2000 | Perona et al. | 382/103 |
| 6,050,490 A | 4/2000 | Leichner et al. | 235/462.49 |
| 6,081,261 A | 6/2000 | Wolff et al. | 345/179 |
| 6,100,877 A | 8/2000 | Chery et al. | 345/178 |
| 6,104,387 A | 8/2000 | Chery et al. | 345/179 |
| 6,104,388 A | 8/2000 | Nagai et al. | 345/179 |
| 6,108,444 A | 8/2000 | Syeda-Mahmood | 382/186 |
| 6,111,565 A | 8/2000 | Chery et al. | 345/179 |
| 6,124,847 A | 9/2000 | Chery et al. | 345/173 |
| 6,130,666 A | 10/2000 | Persidsky | 345/179 |
| 6,147,681 A | 11/2000 | Chery et al. | 345/179 |
| 6,153,836 A | 11/2000 | Goszyk | 178/19.01 |
| 6,177,927 B1 | 1/2001 | Chery et al. | 345/173 |
| 6,181,329 B1 | 1/2001 | Stork et al. | 345/179 |
| 6,184,873 B1 | 2/2001 | Ward et al. | 345/179 |
| 6,188,392 B1 | 2/2001 | O'Connor et al. | 345/179 |
| 6,208,330 B1 | 3/2001 | Hasegawa et al. | 345/173 |
| 6,212,296 B1 | 4/2001 | Stork et al. | 382/188 |
| 6,213,398 B1 | 4/2001 | Southworth et al. | 235/454 |
| 6,243,503 B1 | 6/2001 | Teufel et al. | 382/312 |
| 6,262,719 B1 | 7/2001 | Bi et al. | 345/179 |
| 6,278,440 B1 | 8/2001 | Katsurahira et al. | 345/163 |
| 6,292,177 B1 | 9/2001 | Holtzman et al. | 345/173 |
| 6,330,359 B1 | 12/2001 | Kawabata | 382/188 |
| 6,334,003 B1 | 12/2001 | Yokota | 382/313 |
| 6,335,723 B1 | 1/2002 | Wood et al. | 345/173 |
| 6,335,724 B1 | 1/2002 | Takekawa et al. | 345/173 |
| 6,335,727 B1 | 1/2002 | Morishita et al. | 345/179 |
| 6,348,914 B1 | 2/2002 | Tuli | 345/179 |
| 6,396,481 B1 | 5/2002 | Challa et al. | 345/169 |
| 6,414,673 B1 | 7/2002 | Wood et al. | 345/173 |
| 6,421,042 B1 | 7/2002 | Omura et al. | 345/157 |
| 6,422,775 B1 | 7/2002 | Bramlett et al. | 401/195 |
| 6,424,340 B1 | 7/2002 | Holtzman et al. | 345/173 |
| 6,429,856 B1 | 8/2002 | Omura et al. | 345/175 |
| 6,437,314 B1 | 8/2002 | Usuda et al. | 250/221 |
| 6,454,482 B1 | 9/2002 | Silverbrook et al. | 461/195 |
| 6,456,749 B1 | 9/2002 | Kasabach et al. | 382/314 |
| 6,474,888 B1 | 11/2002 | Lapstun et al. | 401/45 |
| 6,492,981 B1 | 12/2002 | Stork et al. | 345/179 |
| 6,498,604 B1 | 12/2002 | Jensen | 345/179 |
| 6,535,206 B1 | 3/2003 | Xu | 345/179 |
| 6,540,415 B1 | 4/2003 | Slatter et al. | 396/428 |
| 6,556,190 B2 | 4/2003 | Fleck et al. | 345/179 |
| 6,573,887 B1 | 6/2003 | O'Donnell, Jr. | 345/179 |
| 6,577,299 B1 | 6/2003 | Schiller et al. | 345/179 |
| 6,592,039 B1 | 7/2003 | Smith et al. | 235/462.49 |
| 6,627,870 B1 | 9/2003 | Lapstun et al. | 250/221 |
| 6,628,847 B1 | 9/2003 | Kasabach et al. | 382/314 |
| 6,636,635 B2 | 10/2003 | Matsugu | 382/218 |
| 6,650,320 B1 | 11/2003 | Zimmerman | 345/179 |
| 6,686,579 B2 | 2/2004 | Fagin et al. | 250/208.1 |
| 6,686,910 B2 | 2/2004 | O'Donnell, Jr. | 345/179 |
| 6,689,966 B2 | 2/2004 | Wiebe | 178/18.01 |
| 6,727,885 B1 | 4/2004 | Ishino et al. | 345/156 |
| 6,972,753 B1 * | 12/2005 | Kimura et al. | 345/175 |
| 2002/0001029 A1 | 1/2002 | Abe | 348/49 |
| 2002/0028017 A1 | 3/2002 | Munich et al. | 382/187 |
| 2002/0048404 A1 | 4/2002 | Fahraeus et al. | 382/188 |
| 2002/0118181 A1 | 8/2002 | Sekendur | 345/179 |
| 2002/0148655 A1 | 10/2002 | Cho et al. | 178/18.09 |
| 2002/0158848 A1 | 10/2002 | Sekendur | 345/173 |
| 2002/0163511 A1 | 11/2002 | Sekendur | 345/179 |
| 2002/0180714 A1 | 12/2002 | Duret | 345/179 |
| 2003/0006973 A1 | 1/2003 | Omura et al. | 345/175 |
| 2003/0025951 A1 | 2/2003 | Pollard et al. | 358/505 |
| 2003/0029919 A1 | 2/2003 | Lynggaard et al. | 235/472.03 |
| 2003/0034961 A1 | 2/2003 | Kao | 345/179 |
| 2003/0106985 A1 | 6/2003 | Fagin et al. | 250/208.1 |
| 2003/0107558 A1 | 6/2003 | Bryborn et al. | 345/179 |
| 2003/0195820 A1 | 10/2003 | Silverbrook et al. | 705/26 |

FOREIGN PATENT DOCUMENTS

| | | |
|---|---|---|
| WO | WO 02/017222 A2 | 2/2002 |
| WO | WO 02/058029 A2 | 7/2002 |
| WO | WO 02/064380 A1 | 8/2002 |
| WO | WO 02/069247 A1 | 9/2002 |
| WO | WO 02/084634 A1 | 10/2002 |

OTHER PUBLICATIONS

Ansar et al., Linear Pose Estimation from Points or Lines, ECCV 2002, LNCS 2353, pp. 282-296, 2002, Springer-Verlag Berlin Heidelberg 2002.

UDE, Nonlinear Least Squares Optimisation of Unit Quaternion Functions for Pose Estimation from Corresponding Features, Conf. Pattern Recognition, Brisbane, pp. 425-427Aug. 1998.

Anoto Pen Technology, Document printed from Internet Jan. 31, 2003 http://211.21.66.14/3c/silicon/internet_appliance/ia_anotopen.html.

Ait-Aider et al., "Adaptation of Lowe's camera pose recovery algorithm to mobile robot self-localisation", Robotica—Feb. 2002.

Baker and Nayar, "Global Measures of Coherence for Edge Detector Evaluation", pp. 373-379. 1999 Conference on Computer Vision and Pattern Recognition, Jun. 1999 (vol. 2).

Batista et al., "Pose View Stability Analysis for Camera Look Angles Computation", Institute of Systems and Robotics—Dep. of Elec. Engineering, Univ. of Coimbra, Portugal.

Geyer and Daniilidis, "A Unifying Theory for Central Panoramic Systems and Practical Implications", www.cis.upenn.edu.

Horn, "Tsai's Camera Calibration Method Revisited", 2000.

Kumler and Bauer, "Fisheye Lens Designs and Their Relative Performance", SPIE.

Makadia and Daniilidis, "Direct 3-D Rotation Estimation from Spherical Images via a Generalized Shift Theorem", Dep. of Computer and Information Science, Univ. of Pennsylvania.

Schramm and Meyer, "Computer Graphic Simulation of Light Reflection from Paper", IS&T's 1998 PCIS Conference, pp. 412-423.

Schroering et al., "A New Input Device for 3D Sketching", Washington University in St. Louis.

Shakernia et al., Infintesimal Motion Estimation from Multiple Central Panoramic Views, Dept.of EECS, University of California, Berkeley.

Tomasi and Zhang, "How to Rotate a Camera", Computer Science Department, Stanford University.

* cited by examiner

| Look-up Table 1 | |
|---|---|
| α β γ δ | φ |
| 0° | 0° |
| . | . |
| .... | . |
| . | . |
| 90° | 360° |

| Look-up Table 2 | |
|---|---|
| $\int A d\eta$ | θ |
| area | 0° |
| . | . |
| . | . |
| . | . |
| | 45° |

IMPLEMENT FOR OPTICALLY INFERRING INFORMATION FROM A PLANAR JOTTING SURFACE

RELATED APPLICATIONS

This application claims priority from U.S. Provisional Patent Application No. 60/450,244 filed on Feb. 24$^{th}$, 2003.

FIELD OF THE INVENTION

The present invention relates generally to acquisition of information written, drawn, sketched or otherwise marked on a jotting or writing surface by a user with the aid of a hand-held implement, such as a writing implement.

BACKGROUND OF THE INVENTION

The art of writing and drawing is ancient and rich in traditions. Over the ages various types of implements have been used for writing down words as well as drawing, sketching, marking and painting. Most of these implements have a generally elongate shape, an essentially round cross-section and they are terminated at one end by a writing nib or tip. They are typically designed to be hand-held and operated by the user's preferred hand (e.g., by the right hand for right-handed persons). More specifically, the user moves the implement across a writing or jotting surface such that the writing nib leaves a visible trace marking its motion on the surface. The marking can be produced by a material deposited from the nib, e.g., through abrasion of the marking material (such as charcoal in the case of a pencil) or by direct wetting of the surface by an ink (as in the case of the pen). The marking can also include any other physical trace left on the surface.

The most widely used writing and drawing implements include pens and pencils while the most convenient jotting surfaces include sheets of paper of various sizes and other generally planar objects capable of being marked. In fact, despite the tremendous advances in sciences and engineering, pen and paper remain among the simplest and most intuitive devices for writing, drawing, marking and sketching even in the electronic age.

The challenge of communicating with electronic devices is in the very input interface to the electronic device. For example, computers take advantage of input devices such as keyboards, buttons, pointer devices, mice and various other types of apparatus that encode motion and convert it to data that the computer can process. Unfortunately, none of these devices are as user-friendly and accepted as pen and paper.

This input interface problem has been recognized in the prior art and a variety of solutions have been proposed. Most of these solutions attempt to derive electronic, i.e., digital data from the motions of a pen on paper or some other writing surface, e.g., a writing tablet. Of these prior art teachings the following references are of note:

| U.S. Pat. Nos. | | | | |
| --- | --- | --- | --- | --- |
| 4,471,162 | 4,896,543 | 5,103,486 | 5,215,397 | 5,226,091 |
| 5,294,792 | 5,333,209 | 5,434,371 | 5,484,966 | 5,517,579 |
| 5,548,092 | 5,661,506 | 5,577,135 | 5,581,276 | 5,587,558 |
| 5,587,560 | 5,652,412 | 5,661,506 | 5,717,168 | 5,737,740 |
| 5,750,939 | 5,774,602 | 5,781,661 | 5,902,968 | 5,939,702 |
| 5,959,617 | 5,960,124 | 5,977,958 | 6,031,936 | 6,044,165 |
| 6,050,490 | 6,081,261 | 6,100,877 | 6,104,387 | 6,104,388 |
| 6,108,444 | 6,111,565 | 6,124,847 | 6,130,666 | 6,147,681 |
| 6,153,836 | 6,177,927 | 6,181,329 | 6,184,873 | 6,188,392 |
| 6,213,398 | 6,243,503 | 6,262,719 | 6,292,177 | 6,330,359 |
| 6,334,003 | 6,335,723 | 6,335,724 | 6,335,727 | 6,348,914 |
| 6,396,481 | 6,414,673 | 6,421,042 | 6,422,775 | 6,424,340 |
| 6,429,856 | 6,437,314 | 6,456,749 | 6,492,981 | 6,498,604 |

| U.S. Published applications: | | |
| --- | --- | --- |
| 2002-0001029 | 2002-0028017 | 2002-0118181 |
| 2002-0148655 | 2002-0158848 | 2002-0163511 |

European Patent Specifications: 0,649,549B1

| International Patent applications: | | |
| --- | --- | --- |
| WO 02/017222 A2 | WO 02/058029 A2 | WO 02/064380 A1 |
| WO 02/069247 A1 | WO 02/084634 A1 | |

Although the above-referenced teachings provide a number of approaches they are cumbersome to the user. Many of these approaches provide the user with pens that are difficult to handle, impose special writing and/or monitoring conditions and/or they require cumbersome auxiliary systems and devices to track and digitize the information written on the writing surface. Thus, the problem of a user-friendly input interface based on a writing implement has not been solved.

SUMMARY OF THE INVENTION

The present invention provides a jotting implement that infers hand-jotted information from a jotting surface. For the purposes of this invention, hand-jotted information comprises any information marked on the jotting surface as a result of any of the following actions: writing, jotting, drawing, sketching or in any other manner marking or depositing marks on the jotting surface. Additionally, hand-jotted information for the purposes of this application also means information traced on the jotting surface without leaving any markings on the jotting surface. The jotting implement has a nib for jotting and an arrangement for determining when the nib is jotting on the jotting surface. Further, the implement has an optical unit for viewing the jotting surface. The optical unit is preferably mounted at a distal end of the implement with respect to the nib and indexed to it. For the purposes of this invention indexed to the nib means that the optical axis of the optical unit is referenced to the nib, e.g., the optical axis of the optical unit passes through the nib. The implement also has a processing unit for receiving optical data of said jotting surface from said optical unit and for determining from said optical data the physical coordinates of the nib with respect to at least one corner of the jotting surface and at least one edge of the jotting surface.

It should be noted that in contrast to the prior art the implement of the invention infers the physical coordinates of the nib indirectly, i.e., from the optical data of the jotting surface obtained from the optical unit. Therefore, any optical data about the jotting surface sufficient to make the determination of the physical coordinates of the nib can be used. For example, optical data of all corners or a number of corners, edges or portions thereof can be used. Alternatively, landmarks or any optically recognizable features on the jotting surface can be used as well.

The arrangement for determining when the nib is jotting on the jotting surface preferably comprises a pressure sensitive unit mounted in the jotting implement. Strain gauges, mechanical pressure sensors, piezoelectric elements and other types of arrangements recognizing contact between the nib and the jotting surface can be used for this purpose.

In the preferred embodiment the optical unit is an imaging unit for imaging the jotting surface or a portion thereof. It is further preferred that the imaging unit be equipped with a photodetector array for projecting an image of the jotting surface thereon. The processing unit has an edge detection unit or circuit (e.g., firmware in a microprocessor of the processing unit) for detecting edges and corners of the jotting surface in the image.

The jotting implement is further equipped with an image transformation unit for applying one or more transformations to the image. Specifically, the image transformation unit can include appropriate physical optics (e.g., lenses) for correcting the image as well as software routines for correcting the image and performing various operations on the image. For example, the image transformation unit has an image deformation transformer that corrects the image for a plane projection. Alternatively, the image transformation unit has an image deformation transformer that corrects the image for a spherical projection. In the same or a different embodiment, the image transformation unit has an image transformer for determining Euler angles of the jotting implement with respect to the jotting surface.

In the preferred embodiment the corrections and transformations are applied only to the edges and/or corners of the image that are identified by the edge detection unit. In other words, only a part of the image corresponding to the jotting surface and in particular its edges, corners, landmarks or other optically recognizable features and/or their portions are corrected and transformed.

A ratio computation module belonging to the processing unit determines the physical coordinates of the nib from the image. Again, in the preferred embodiment this determination is made from the relevant part of the image corresponding to the jotting surface and in particular its edges, corners, landmarks or other optically recognizable features and/or their portions.

The photodetector array can be any suitable array of photodetectors, including a photodiode or phototransistor array and preferably a CMOS photodetector array. The optics used by the imaging unit can include refractive and/or reflective optics and preferably include a catadioptric system. In any event, the field of view of the optics should be substantially larger than the area of the jotting surface such that the imaging unit can always detect at least one edge and one corner of the jotting surface for any possible position of the jotting implement when the nib is in contact with the jotting surface.

In order to determine the physical coordinates of the nib at a sufficient rate to determine what the user has written, sketched or drawn the implement has a frame control unit.

The frame control unit sets a certain frame rate at which the jotting surface is imaged. Preferably, this frame rate is at least 15 Hz, and more preferably it is in excess of 30 Hz.

Finally, the jotting implement is provided with a device for communicating the physical coordinates of the nib with an external unit. The device for communicating these coordinates can include any type of data transmission port including but not limited to infra-red (IR) ports, ultrasound ports, optical ports and the like. The external unit can be a computer, a hand-held device, a network terminal, a downloading unit, an electronic gateway into a wide area network (WAN) (e.g., the internet) or a local area network (LAN), a storage device, a printer or any other external unit which can store, print, relay and/or further process the physical coordinates of the nib. It should be noted that, depending on the application and requirements, the physical coordinates of the nib can be processed in real time or not.

In the preferred embodiment the implement is further equipped with an arrangement for initializing and recognizing the jotting surface. Of course, the sizes and types jotting surfaces can also be selected or input by the user. The arrangement for initializing and recognizing can include the optical unit and processing unit described above and a memory with standard sizes of likely jotting surfaces. For example, when the jotting surfaces are expected to be sheets of paper of standard sizes, the images of such sheets can be stored in the memory. Preferably, these stored images are taken at well-known positions and orientations of the jotting implement with respect to the jotting surface. In other words, they are taken at known physical coordinates of the nib on the jotting surface and known spatial orientation of the jotting implement (e.g., at known Euler angles).

The details of the invention will now be explained in the attached detailed description with reference to the attached drawing figures.

DETAILED DESCRIPTION

Figure 1:
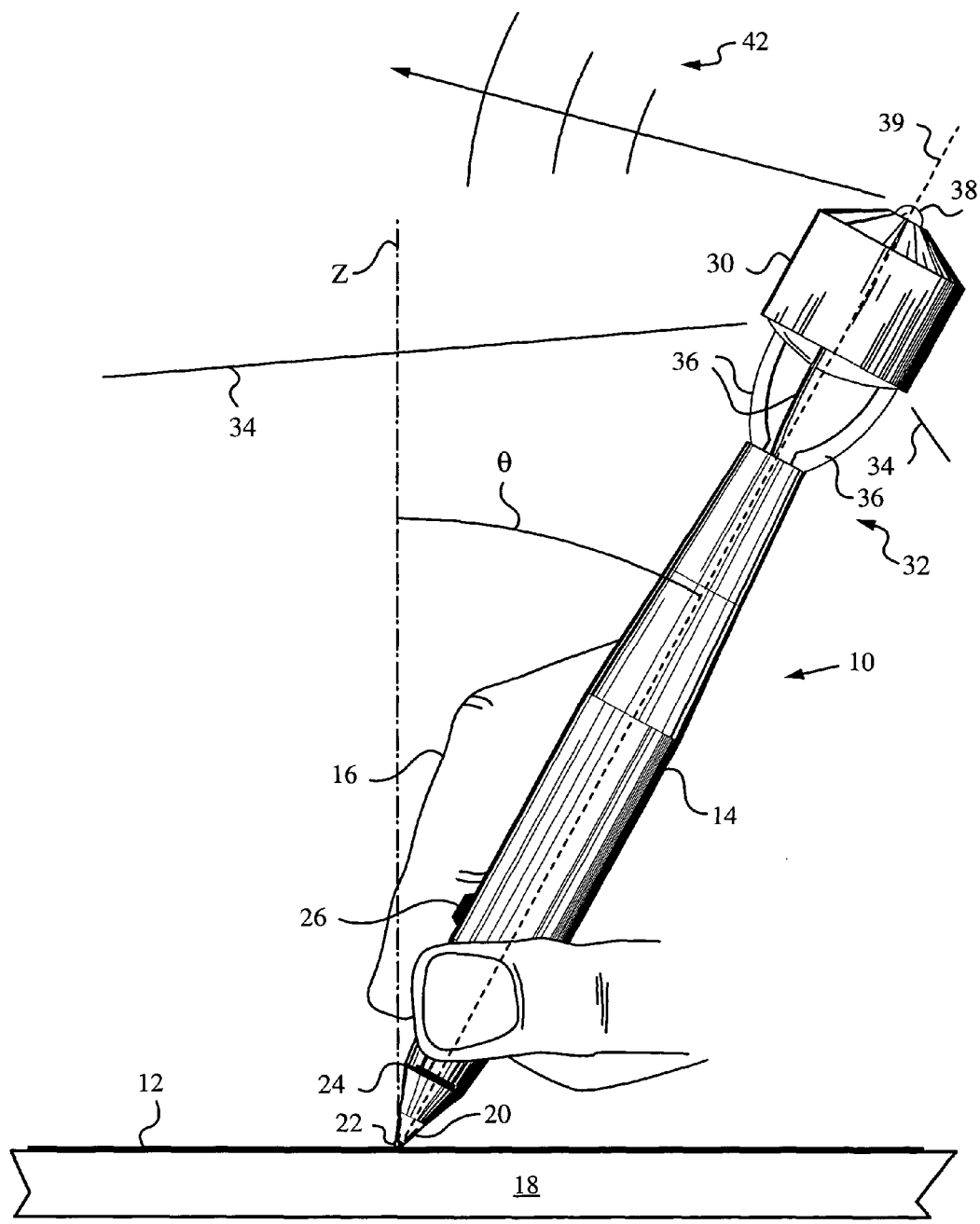
FIG. 1 is a side view of a jotting implement in accordance with the invention where the jotting implement is shown in the plane of an inclination angle $\theta$ (Euler angle $\theta$).
Figure 2:
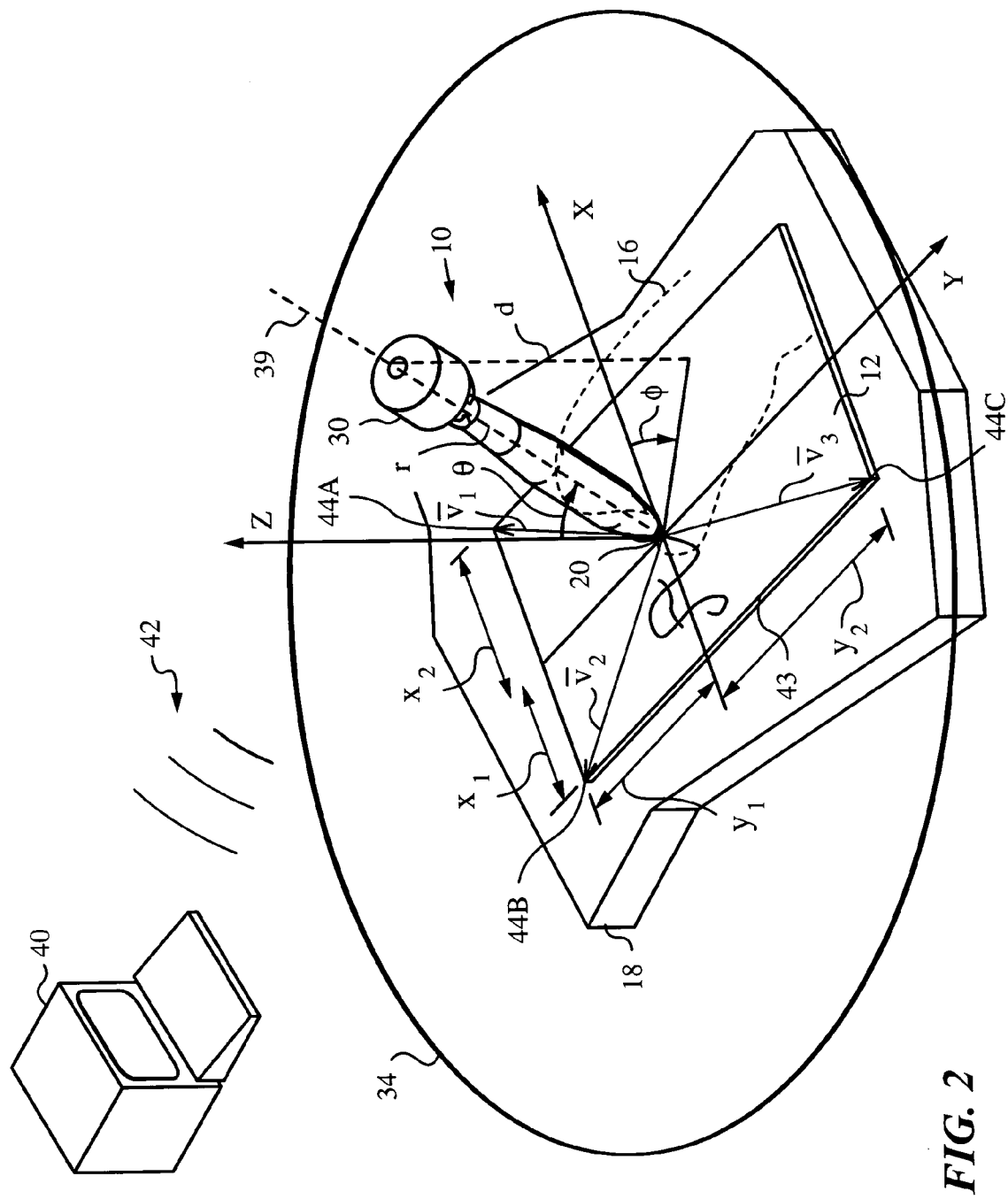
FIG. 2 is a three-dimensional diagram illustrating the physical parameters of the jotting implement of FIG. 1 when in use.
Figure 3:
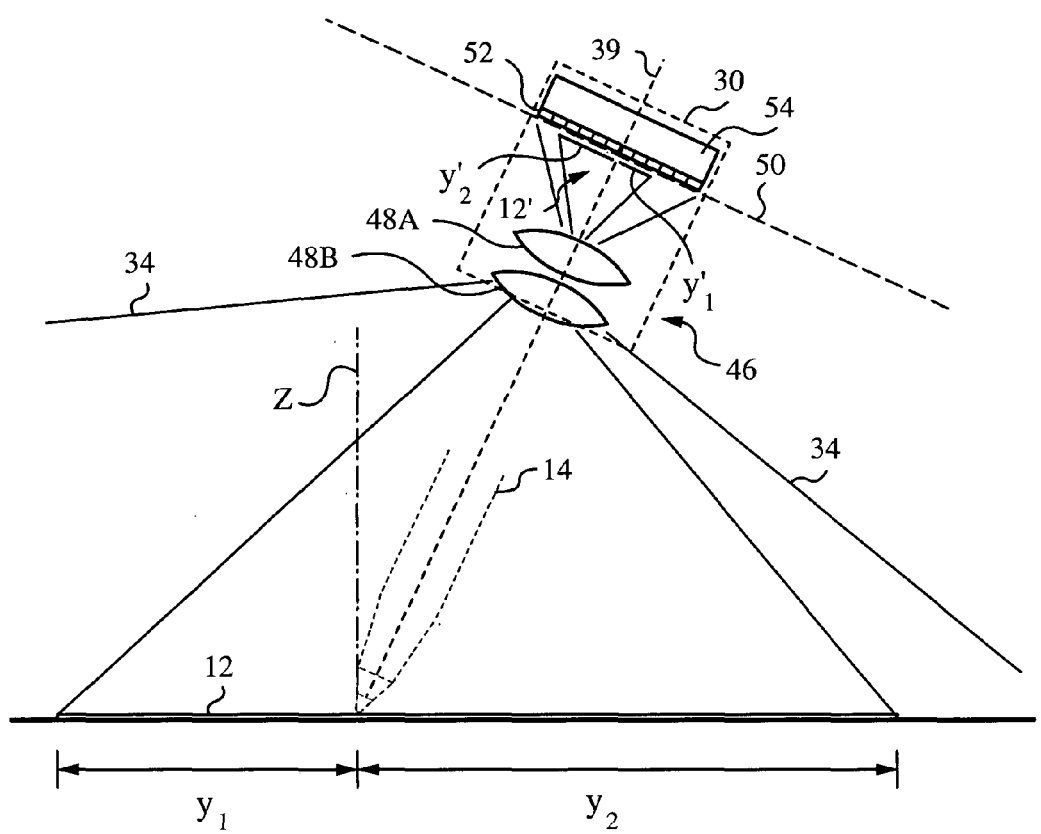
FIG. 3 is a plan side view of the jotting implement of FIG. 1 illustrating the principle of imaging.
Figure 4:
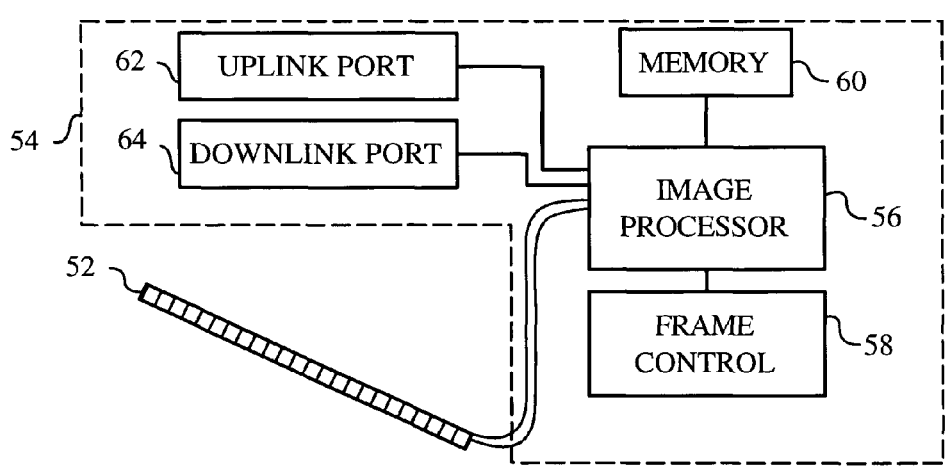
FIG. 4 is a block diagram of the processing unit of the jotting implement of FIG. 1.

The present invention will be best understood by initially referring to the side view of FIG. 1 illustrating a jotting implement 10 in accordance with the invention and the diagrams of FIGS. 2 through 4. Jotting implement 10 shown in FIG. 1 is a pen, more specifically an ink pen, and still more precisely a ball-point pen. However, it will be appreciated that jotting implement 10 can be a marker, a pencil a brush or indeed any other writing, sketching, drawing or painting implement that can jot information on a jotting surface 12. Alternatively, jotting implement 10 can also be a stylus or any device that jots information on jotting surface 12 by tracing that information without leaving any permanent markings or deformations on the jotting surface. Such jotting surface can include a pressure-sensitive digitizing tablet or any other surface provided specifically for input into an electronic data processing device. In the present embodiment jotting implement has a shape generally resembling known writing, sketching, drawing or painting devices. Specifically, jotting implement 10 has an elongate body 14 of generally round cross-section designed to be held in a user's hand 16.

In general, jotting surface 12 is a sheet of planar material on which implement 10 can perform a jotting function as defined above. For geometrical reasons, it is preferable that jotting surface 12 be rectangular. In the present embodiment jotting surface 12 is a sheet of paper of any standard or non-standard dimensions laying flat on a support surface 18. In cases where jotting surface 12 is a digitizing tablet such as a tablet of a PDA device, a computer screen or any other sturdy surface then support surface 18 may not be required. It is important, however, that jotting surface 12 have optically recognizable features such as corners, edges, landmarks or the like. It is also important that these features not change their position with respect to the remainder of jotting surface 12 during the jotting operation.

Implement 10 has a nib 20 terminating in a ball-point 22. A pressure sensor 24 is mounted proximate nib 20 for determining when nib 20 is jotting. Jotting occurs when ball-point 22 is in contact with jotting surface 12. Conveniently, pressure sensor 24 is a strain gauge. Alternatively, pressure sensor 24 is a mechanical pressure sensor or a piezoelectric element. A person skilled in the art will recognize that other pressure sensors can also be used. Implement 10 also has an initialization switch 26. Switch 26 is provided for the user to communicating whether jotting is occurring on the same jotting surface 12 or on a new jotting surface (not shown).

An optical unit 30 is mounted at a distal end 32 of implement 10. Optical unit 30 is designed for viewing jotting surface 12 and it has a field of view 34 demarked by a delimiting line that extends beyond jotting surface, as described in more detail below. In the present embodiment optical unit 30 is mounted on three support members 36. Members 36 can have any construction that ensures mechanical stability and obstructs a negligible portion of field of view 34. Optical unit 30 has an optical axis 39 that is indexed to nib 20. More specifically, optical axis 39 passes through nib 20. Thus, field of view 34 of optical unit 30 is centered on nib 20. Alternatively, optical axis 39 can be indexed to nib 20 at some predetermined offset. For reasons of symmetry of field of view 34, however, it is preferred that optical unit 30 be indexed to nib 20 by passing optical axis 39 through nib 20 and through the center of ball-point 22.

Implement 10 has a device 38 for communicating with an external unit 40 (see FIG. 2). In the present embodiment device 38 is an infra-red (IR) port for transmitting and receiving data encoded in IR radiation 42. Of course, any type of data transmission port including but not limited to ultrasound ports or optical ports can be used as device 38. Meanwhile, external unit 40 can be a computer, a hand-held device, a network terminal, a downloading unit, an electronic gateway into a wide area network (WAN) (e.g., the internet) or a local area network (LAN), a storage device, a printer or any other external unit which can store, print, relay and/or further process the physical coordinates of nib 20.

Referring now to FIG. 2, the physical parameters of implement 10 are conveniently described in terms of a Cartesian coordinate system and a polar coordinate system. The origins of these coordinate systems coincide at the position of nib 20 and more specifically at the position where ball-point 22 contacts jotting surface 12. The Cartesian system has its X-and Y-axes in the plane of jotting surface 12 and aligned with the width and length of jotting surface 12. The Z-axis of the Cartesian system is perpendicular or normal to the plane of jotting surface 12.

A number of features 44A, 44B, 44C are defined by corresponding vectors $v_1$, $v_2$, $v_3$ drawn from the origin of the Cartesian system. In the present case features 44A, 44B, 44C are three corners of jotting surface 12. Alternatively, features 44 can include any edge 43 of jotting surface 12 or any other optically recognizable landmark or feature of jotting surface 12. It should be noted that features produced on jotting surface 12 by the user, including any marks jotted by implement 10, are legitimate features for this purpose.

The polar coordinate system is used to define the orientation of implement 10 with respect to jotting surface 12. The Z-axis of the polar system is coincident with the Z-axis of the Cartesian system. Since optical axis 39 is indexed to nib 20 it passes through the origins of the two coordinate systems.

Thus, in the polar system optical axis 39 defines the polar coordinate r and the length of r, i.e., |r| is the length of implement 10. The inclination of implement 10 with respect to the Z-axis is expressed by polar angle θ, hereafter referred to as inclination angle θ. The angle of rotation of implement 10 about the Z-axis is expressed by polar angle φ.

It is preferred that optical unit 30 be an imaging unit, as shown in the plan view of FIG. 3. Specifically, optical unit 30 is preferably an imaging unit capable of imaging objects present in its field of view 34 and in particular imaging jotting surface 12 with relatively low distortion. In the present embodiment imaging unit 30 has a refractive imaging optics 46 indicated by lenses 48A, 48B. It will be appreciated by a person skilled in the art that suitable refractive imaging optics 46 include lenses which afford a wide field of view with good off-axis optical performance, such as fish-eye lenses or wide-field-of-view lenses. For more specifics on such types of lenses the reader is referred to U.S. Pat. Nos. 4,203,653; 4,235,520; 4,257,678 as well as the article by James "Jay" Kumler et al., "Fisheye lens designs and their relative performance", SPIE, all of which are herein incorporated by reference.

Imaging optics 46 define an image plane 50 as indicated by the dashed line. Imaging unit 30 is further equipped with a photodetector array 52 positioned in image plane 50. An image 12' of jotting surface 12 is projected onto array 52 by imaging optics 46. Preferably, array 52 is a CMOS photodetector array. Of course, other types of photodetector arrays including arrays employing photodiodes or phototransitors of various types can be used as photodetector array 52. A CMOS photodetector array, however, tends to be more efficient, responsive and it tends to consume less power. In addition CMOS arrays have a small pitch thus enabling high resolution.

Field of view 34 afforded by optics 46 is substantially larger than the area of jotting surface 12. In fact, field of view 34 is large enough such that image 12' of entire jotting surface 12 is always projected onto array 52. This condition holds for any jotting position that may be assumed by jotting implement 10 during a jotting operation performed by the user, such as writing near an edge or corner of jotting surface 12 at a maximum possible inclination angle θ (e.g., θ≈40°). Thus, forward and backward portions $y_1$, $y_2$ of jotting surface 12 are always imaged on array 52 as portions $y'_1$, $y'_2$ as long as not obstructed by user's hand 16 or by other obstacles.

It is noted that for purposes of clarity primed reference numbers are used herein to denote parts in image space corresponding to parts bearing the same but unprimed reference numbers in physical space. As additional transformations and operations are applied to parts in the image space, more primes are added to the reference numbers.

Jotting implement 10 has a processing unit 54, which is illustrated in more detail in FIG. 4. Processing unit 54 is designed for receiving optical data of jotting surface 12. In this embodiment the optical data is represented by image 12' of jotting surface 12. From this optical data processing unit 54 determines the physical coordinates of nib 20 with respect to at least one corner and at least one edge of jotting surface 12. In the present embodiment processing unit 54 is designed to determine vectors $v_1$, $v_2$, $v_3$ in the Cartesian coordinate system defined in FIG. 2.

Figure 5:
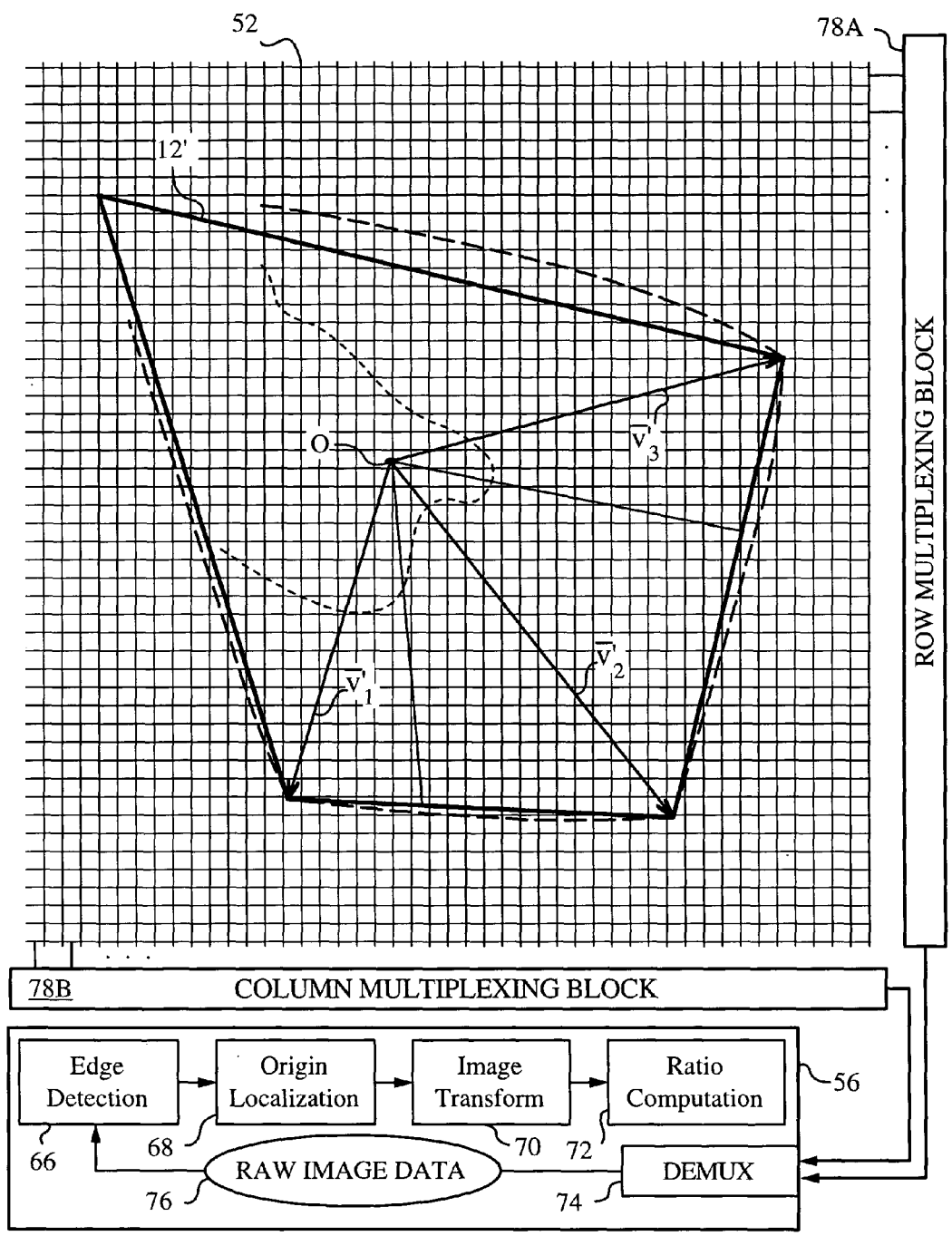
FIG. 5 is a diagram illustrating the image of the jotting surface projected onto a photodetector array belonging to the imaging unit.

To achieve its function processing unit 54 is equipped with an image processor 56, a frame control 58, a memory 60 as well as an uplink port 62 and a downlink port 64. Ports 62, 64 belong to communication device 38. Image processor 56 preferably includes an edge detection unit 66, an origin localization unit 68, an image transformation unit 70 and a ratio computation unit 72, as better shown in FIG. 5. In addition to these elements, image processor 56 has a demultiplexer 74 for receiving and demultiplexing raw image data 76 containing image 12'. Data 76 is delivered from the row 78A and column 78B multiplexing blocks of array 52.

During operation, the user moves implement 10. Once nib 20 of implement 10 is brought in contact with jotting surface 12 pressure sensor 24 activates the acquisition mode of optical unit 30. In the acquisition mode processing unit 54 receives optical data i.e. image 12' of jotting surface 12 as imaged on the pixels of array 52.

Now, image processor 56 captures raw image data 76 of image 12' at a certain frame rate. The frame rate is controlled by frame control 58. The frame rate is fast enough to accurately track the jotting activity of the user. To achieve this the frame rate is set by frame control 58 at 15 Hz or even at 30 Hz or higher.

In contrast with the prior art, the information jotted by the user is not determined by inspecting or imaging the information itself. Rather, the jotted information is inferred by determining the physical coordinates of nib 20 or, more precisely of ball-point 22 with respect to optically recognizable features of jotting surface 12. These recognizable features can include corners, edges or any other landmarks or features produced by the user on jotting surface 12. To determine all information jotted by the user the physical coordinates of nib 20 with respect to the recognizable features are acquired at the set frame rate whenever the acquisition mode is activated by pressure sensor 24.

In the present embodiment, the physical coordinates of nib 20 are determined with respect to three corners 44A, 44B and 44C of jotting surface 12 parametrized with the aid of vectors $v_1$, $v_2$ and $v_3$ (see FIG. 2). To accomplish this goal, processing unit 54 recovers vectors $v_1$, $v_2$, and $v_3$ from imaged vectors $v'_1$, $v'_2$ and $v'_3$ of image 12' (see FIG. 5). This process requires a number of steps.

Figure 6:
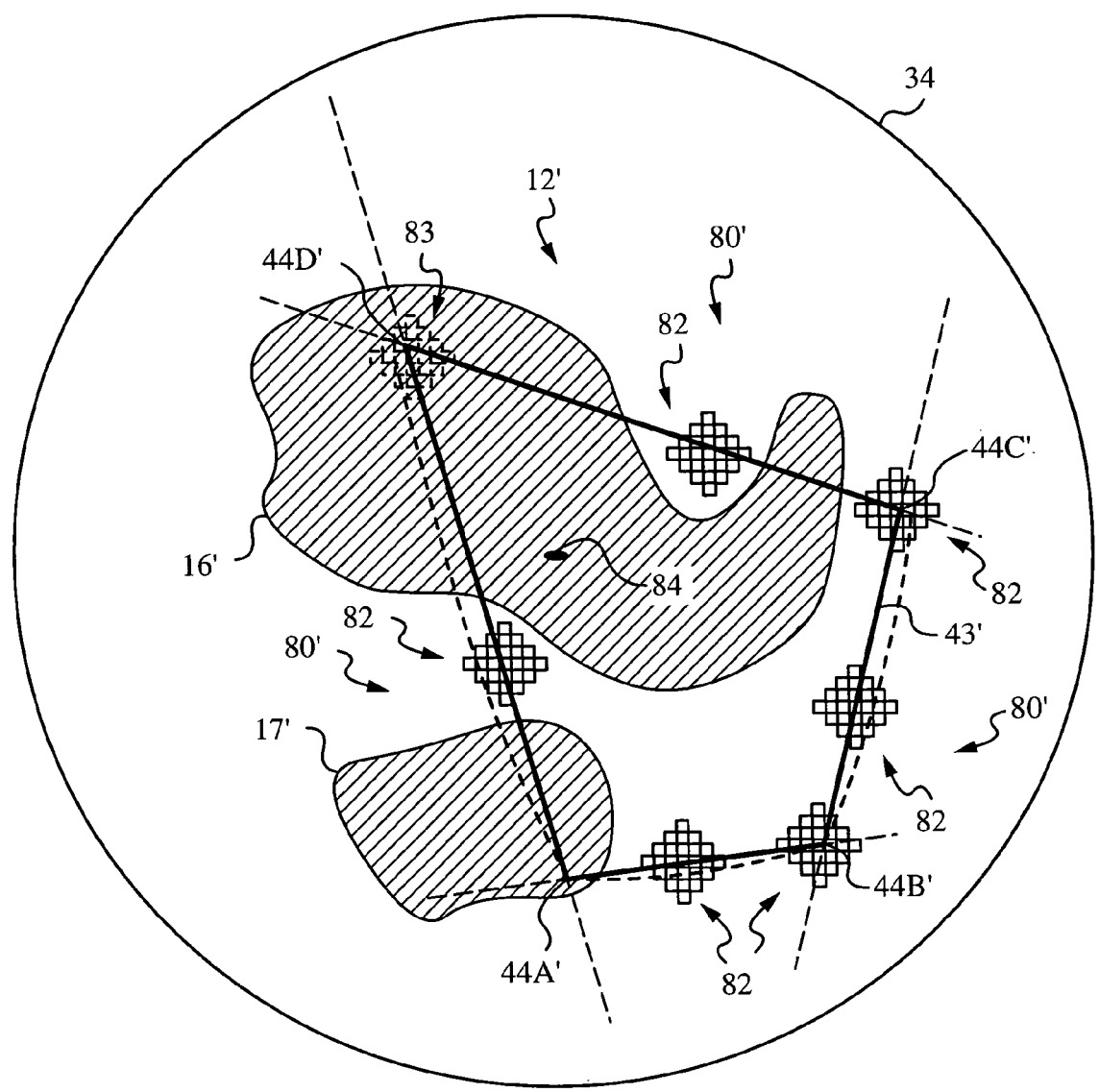
FIG. 6 is a diagram illustrating the process of edge and/or corner detection applied to the image of the jotting surface.

In a first step image processor 56 of processing unit 54 demultiplexes raw image data 76 from row and column blocks 78A, 78B of array 52 with the aid of demultiplexer 74. Next, image processor 56 sends image data 76 to edge detection unit 66. Edge detection unit 66 identifies the edges and corners of image 12' of jotting surface 12. This process is better illustrated in FIG. 6 where unobstructed portions 80' of imaged edges 43' are used for edge detection. For more information on edge detection in images and edge detection algorithms the reader is referred to U.S. Pat. Nos. 6,023,291 and 6,408,109 and to Simon Baker and Shree K. Nayar, "Global Measures of Coherence for Edge Detector Evaluation", Conference on Computer Vision and Pattern Recognition, June 1999, Vol. 2, pp. 373–379 and J. Canny, "A Computational Approach to Edge Detection", IEEE Transactions on Pattern Analysis and Machine Intelligence, Vol. 8, No. 6, November 1986 for basic edge detection all of which are herein incorporated by reference.

In practice, user's hand 16 is an obstruction that obscures a portion of jotting surface 12. Hence, a corresponding shadow 16' is present in image 12'. Another shadow 17' (or a number of shadows) will frequently be produced by other objects covering jotting surface 12 or located between jotting surface 12 and optical unit 30. Such objects typically include the user's other hand and/or body parts such as hair (not shown). For the purposes of the present invention it is only necessary that image 12' have a few unobstructed portions 80' of imaged edges 43', preferably including two or more corners, e.g., 44A', 44B' and 44C' to enable recovery of vectors $v_1$, $v_2$ and $v_3$ and consequent determination of the physical coordinates of nib 20.

Thus, despite shadows 16' and 17' several unobstructed portions 80' of imaged edges 43' are available to edge detection unit 66. A number of pixel groups 82 whose optical data 76 can be used by edge detection unit 66 for edge detection purposes are indicated. It should be noted that in some circumstances a pixel group 83 which is obscured by a shadow, e.g., by shadow 16' may become visible and can then be used to detect corner 44D'.

Edge detection unit 66 recognizes edges 43' and describes them in terms of their vector equations or other suitable mathematical expressions with reference to a center 84 of field of view 34. In order to serve as reference, center 84 is set with the aid of origin localization unit 68. This can be performed prior to operating jotting implement 10, e.g., during first initialization and testing of jotting implement 10 and whenever re-calibration of origin location becomes necessary due to mechanical reasons. The initialization can be performed with the aid of any suitable algorithm for fixing the center of an imaging system. For further information the reader is referred to Carlo Tomasi and John Zhang, "How to Rotate a Camera", Computer Science Department Publication, Stanford University and Berthold K. P. Horn, "Tsai's Camera Calibration Method Revisited", which are herein incorporated by reference and attached as appendices hereto.

In accordance with the invention center 84 coincides with optical axis because optical unit 30 is indexed to nib 20. Hence, for any orientation of jotting implement 10 in physical space, i.e., for any value of inclination angle θ and polar angle φ, center 84 of field of view 34 is always coincident with the position of nib 20 and its image 20'. Systems having this property are commonly referred to as central systems in the art and they include various types of central panoramic systems and the like. It should be noted that image 20' of nib 20 is not actually visible in field of view 34, because body 14 of jotting implement 10 obscures center 84 at all times.

Due to optical effects including aberration associated with imaging optics 46, the detected portion of image 12' will exhibit a certain amount of rounding of edges 43', as indicated in dashed lines. This rounding can be compensated optically by lenses 48A, 48B and/or by any additional lenses (not shown) as well as electronically by processing unit 54. Preferably, the rounding is accounted for by applying a transformation to detected portion of image 12' by image transformation unit 70. For example, image transformation unit 70 has an image deformation transformer based on a plane projection to produce a perspective view. Alternatively, image transformation unit 70 has an image deformation transformer based on a spherical projection to produce a spherical projection. Advantageously, such spherical projection can be transformed to a plane projection with the aid of well-known methods, e.g., as described by Christopher Geyer and Kostas Daniilidis, "A Unifying Theory for Central Panoramic Systems and Practical Implications", www-.cis.upenn.edu, Omid Shakernia, et al., "Infinitesimal Motion Estimation from Multiple Central Panoramic Views", Department of EECS, University of California, Berkeley, and Adnan Ansar and Kostas Daniilidis, "Linear Pose Estimation from Points or Lines", Jet Propulsion Laboratory, California Institute of Technology and GRASP Laboratory, University of Pennsylvania which are herein incorporated by reference and attached as appendices hereto.

Now, once image 12' is recognized and transformed the orientation of jotting implement 10 is determined. This can be done in a number of ways. For example, when working with the spherical projection, i.e., with the spherical projection of unobstructed portions image 12', a direct three-dimensional rotation estimation can be applied to recover inclination angle θ and polar angle φ. For this purpose a normal view of jotting surface 12 is stored in memory 60, such that it is available to transformation unit 70 for reference purposes. The transformation then yields the Euler angles of jotting implement 10 with respect to jotting surface 12 by applying the generalized shift theorem. This theorem is related to the Euler theorem stating that any motion in three-dimensional space with one point fixed (in this case the point where nib 20 is in contact with jotting surface 12 is considered fixed for the duration of each frame) can be described by a rotation about some axis. For more information about the shift theorem the reader is referred to Ameesh Makadia and Kostas Daniilidis, "Direct 3D-Rotation Estimation from Spherical Images via a Generalized Shift Theorem", Department of Computer and Information Science, University of Pennsylvania, which is herein incorporated by reference.

Alternatively, when working with a plane projection producing a perspective view of unobstructed portions of image 12' one can use standard rules of geometry to determine inclination angle θ and polar angle φ. Several geometrical methods taking advantage of the rules of perspective views can be employed in this case.

Figure 7A:
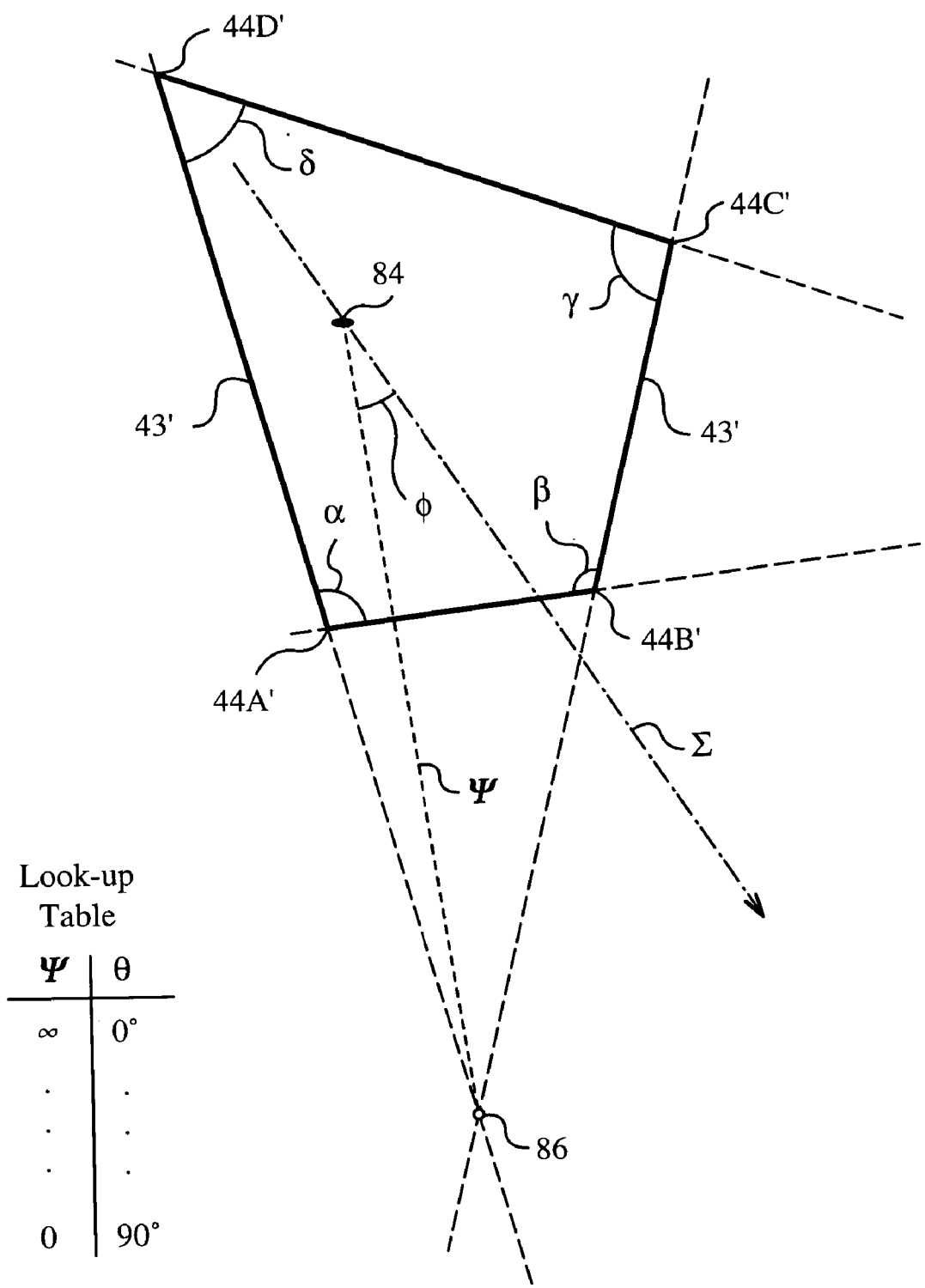
FIGS. 7A–D are diagrams illustrating the functions performed by the processing unit on the image to determine the orientation of the jotting implement with respect to the jotting surface in terms of Euler angles.
Figure 8:
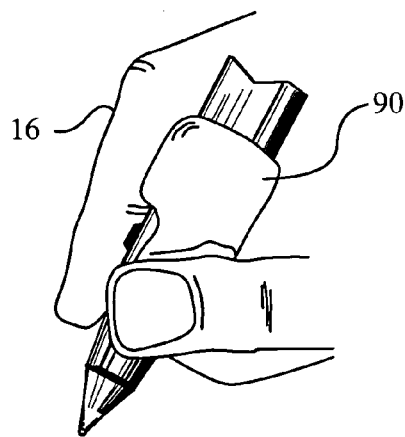
FIG. 8 is a side view illustrating an alternative embodiment of a jotting implement having an orienting grip.

One geometrical method is shown in FIG. 7A, where entire image 12' is shown for clarity (disregarding obstructed portions or filling them in with equations of edges 43' derived in the above step), two edges 43' are extended to vanishing point 86. A connecting line Ψ from center 84 to vanishing point 86 is constructed. A line Σ in the plane of inclination angle θ is also constructed. Now, the angle between lines Ψ and Σ is equal to polar angle φ. Meanwhile, the length of line Ψ from center 84 to vanishing point 86 is inversely proportional to inclination angle θ. Preferably, a look-up table with values of Ψ corresponding to values of inclination angle θ is stored in memory 60 to facilitate rapid identification of angle θ during each frame. It should be noted that in order to keep track of the plane of inclination angle θ rotation of jotting implement 10 around optical axis 39 has to be known. This rotation can be established by providing a key e.g., in the form of a grip 90 on jotting implement 10, as shown in FIG. 8. Grip 90 forces hand 16 of the user to hold jotting implement without rotating it around axis 39.

Figure 7B:
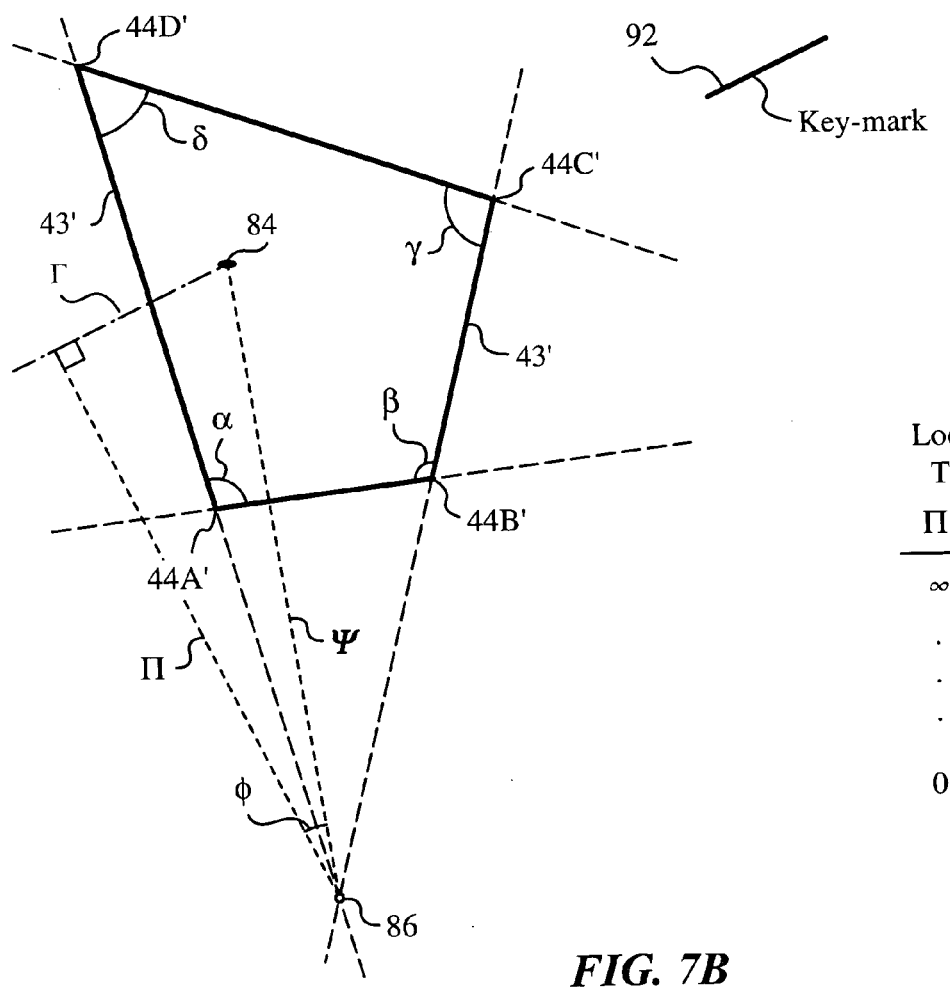

Another geometrical method is shown in FIG. 7B, where entire image 12' is once again shown for clarity. Here, again, two edges 43' are extended to vanishing point 86. A connecting line Ψ from center 84 to vanishing point 86 is constructed. A line Γ in the plane perpendicular to the plane of inclination angle θ is also constructed. Now, a line Π is constructed from vanishing point 86 and perpendicular to line Γ. The angle between lines Π and Ψ is equal to polar angle φ. Meanwhile, the length of line Π from intercept with line Γ to vanishing point 86 is inversely proportional to inclination angle θ. Preferably, a look-up table with values of Π corresponding to values of inclination angle θ is stored in memory 60 to facilitate rapid identification of angle θ during each frame. In this embodiment a key-mark 92 on array 52 or on some other part of jotting implement 10 is used to keep track of the plane perpendicular to the plane of inclination angle θ and it is indexed to an appropriate grip on the pen, e.g., as the one shown in FIG. 8.

Figure 7C:
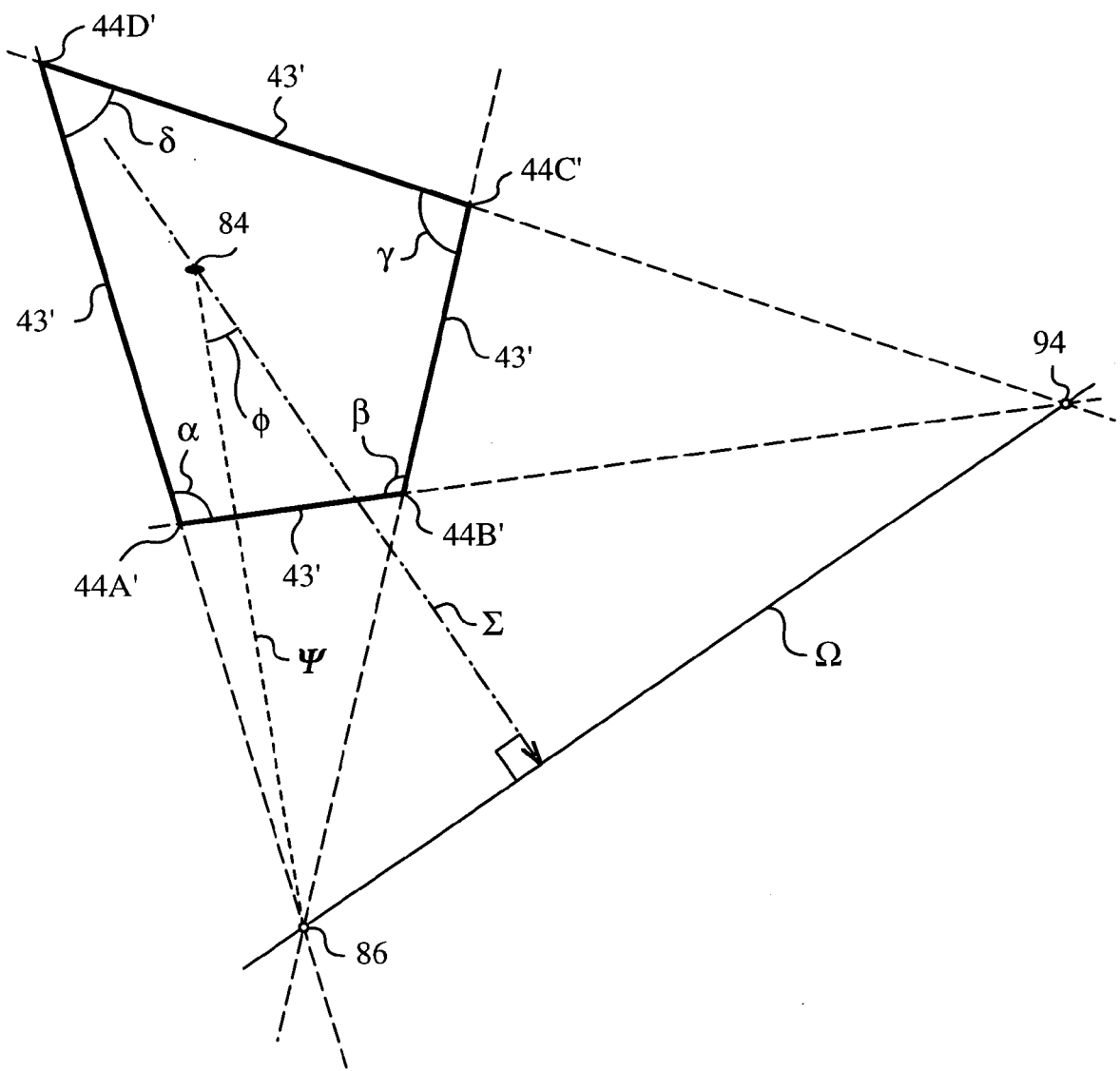

Yet another geometrical method is shown in FIG. 7C based on entire image 12'. Here, connecting line Ψ is constructed from center 84 to vanishing point 86 defined by two edges 43'. A second vanishing point 94 is located by extending the other two edges 43'. Second vanishing point 94 is then joined by line Ω with vanishing point 86. Line Σ is now constructed from center 84 to line Ω such that it intersects line Ω at a right angle. The angle between lines Ψ and Σ is equal to polar angle φ and either the length of line Ψ or the length of line Σ (or even the length of line Ω) can be used to derive inclination angle θ. Once again, the use of corresponding look-up tables is recommended for rapid processing. It should be noted that this embodiment does not require the use of a key-mark or grip since rotation of jotting implement 10 around optical axis 39 (which is also the center axis of jotting implement 10) does not affect this geometrical construction.

Figure 7D:
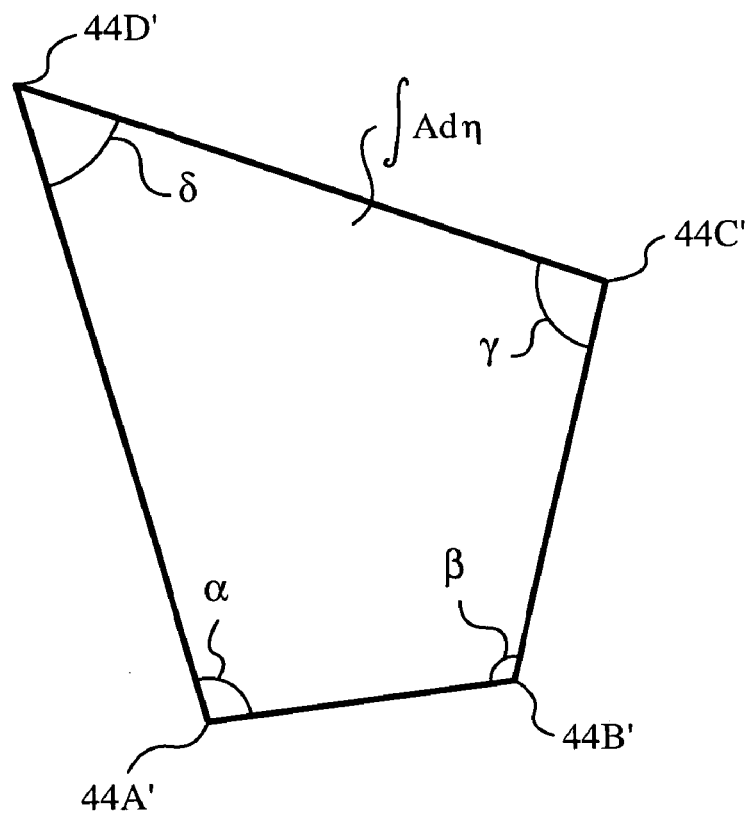

Still another geometrical method is shown in FIG. 7D. In this case corner angles α, β, γ and δ (when unobstructed) as well as the area integral of image 12' are used to determine θ and φ. Specifically, the values of corner angles α, β, γ and δ uniquely define angle φ. Likewise, the values of the area integral uniquely define θ. Corresponding look-up tables stored in memory 60 can be used for rapid processing and determination of angles θ, φ in this embodiment.

Figure 9:
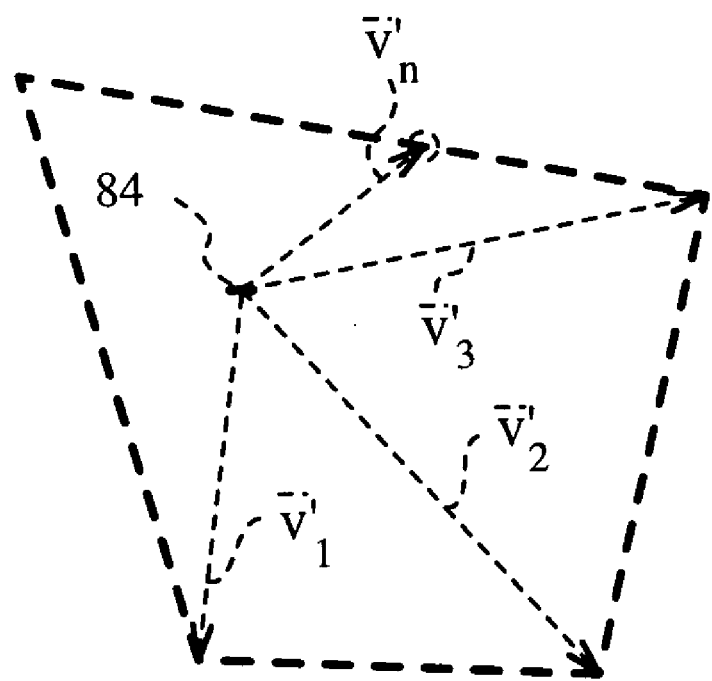
FIG. 9 is a diagram illustrating the process of image correction and parametrization.
Figure 9:
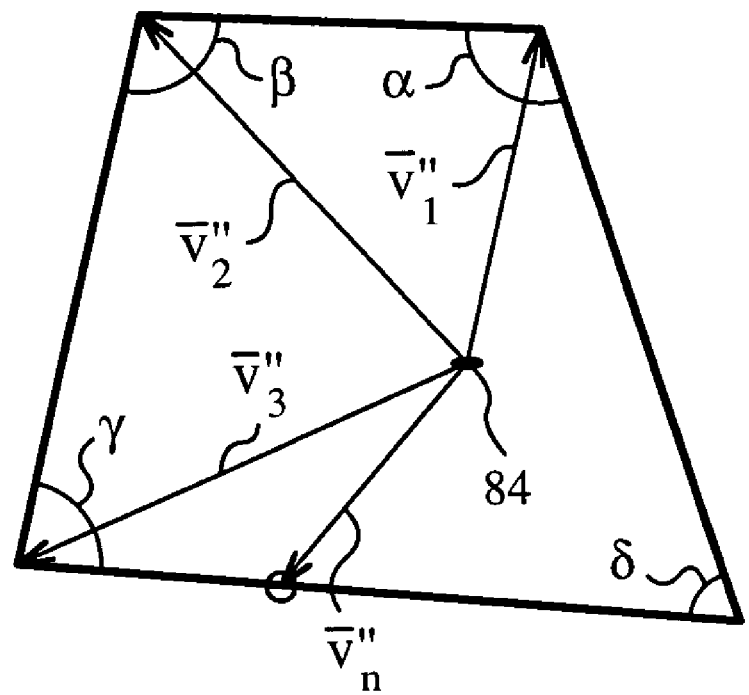

In the case where imaging optics 46 invert image 12' with respect to the physical orientation of jotting surface 12 image 12' needs to be inverted, as illustrated in FIG. 9. This inversion can be performed by transformation unit 70 at any point in time. For example, image 12' can be inverted before applying the above steps for determining θ and φ or after. If image 12' is not inverted, then no inversion needs to be performed.

Figure 10:
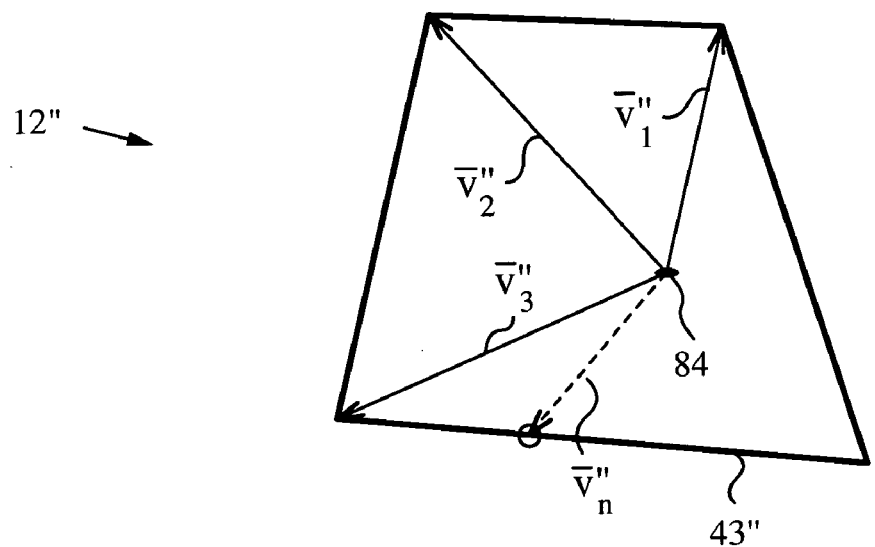
FIG. 10 is a diagram illustrating the parameterized corrected image.

A transformed and inverted (as necessary) image 12" is illustrated in FIG. 10. At this point vectors $v''_1$, $v''_2$ and $v''_3$ are re-computed. An additional vector $v''_n$ from center 84 to a feature or landmark on an edge 43" is also shown. Such landmark on edge 43 of jotting surface 12 can be used instead of a corner for determining the physical coordinates of nib 20. This is especially important when two corners are obstructed by the user or any object(s) located between jotting surface 12 and optical unit 30.

Figure 11:
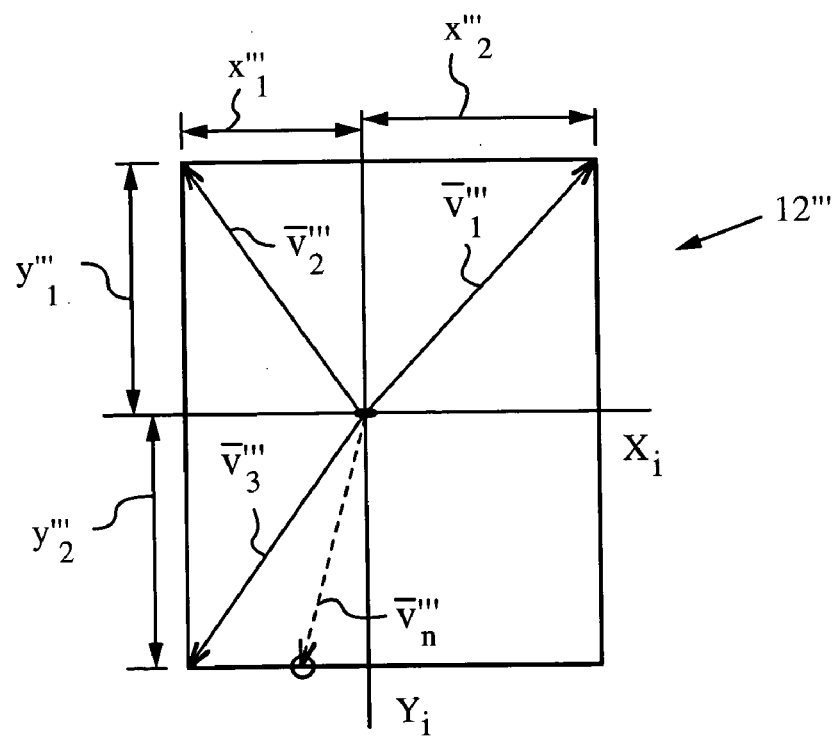
FIG. 11 is a diagram illustrating the parametrized, corrected and transformed image from which the physical coordinates of the nib are determined.

At this point image 12" is corrected for rotations by angles θ and φ to obtain final transformed and corrected image 12''', as shown in FIG. 11. This is done by applying the appropriate inverse rotations to transformed (and inverted, as the case may be) image 12". (These inverse rotations correspond to Euler rotations in physical space of jotting implement 10 with respect to jotting surface 12. Standard Euler transformation is described in any classical mechanics textbook such as Goldstein, *Classical Mechanics*).

Now the physical coordinates of nib 20 can be determined directly from vectors $v'''_1$, $v'''_2$, $v'''_3$ and/or vector $v'''_n$. This function is performed by ratio computation unit 72, which takes advantage of the fact that the proportions of image 12''' to jotting surface 12 are preserved.

Specifically, computation unit 72 employs the following ratios:

$$\frac{x_1}{x_2} = \frac{x'''_1}{x'''_2}, \text{ and}$$

$$\frac{y_1}{y_2} = \frac{y'''_1}{y'''_2}.$$

Figure 12:
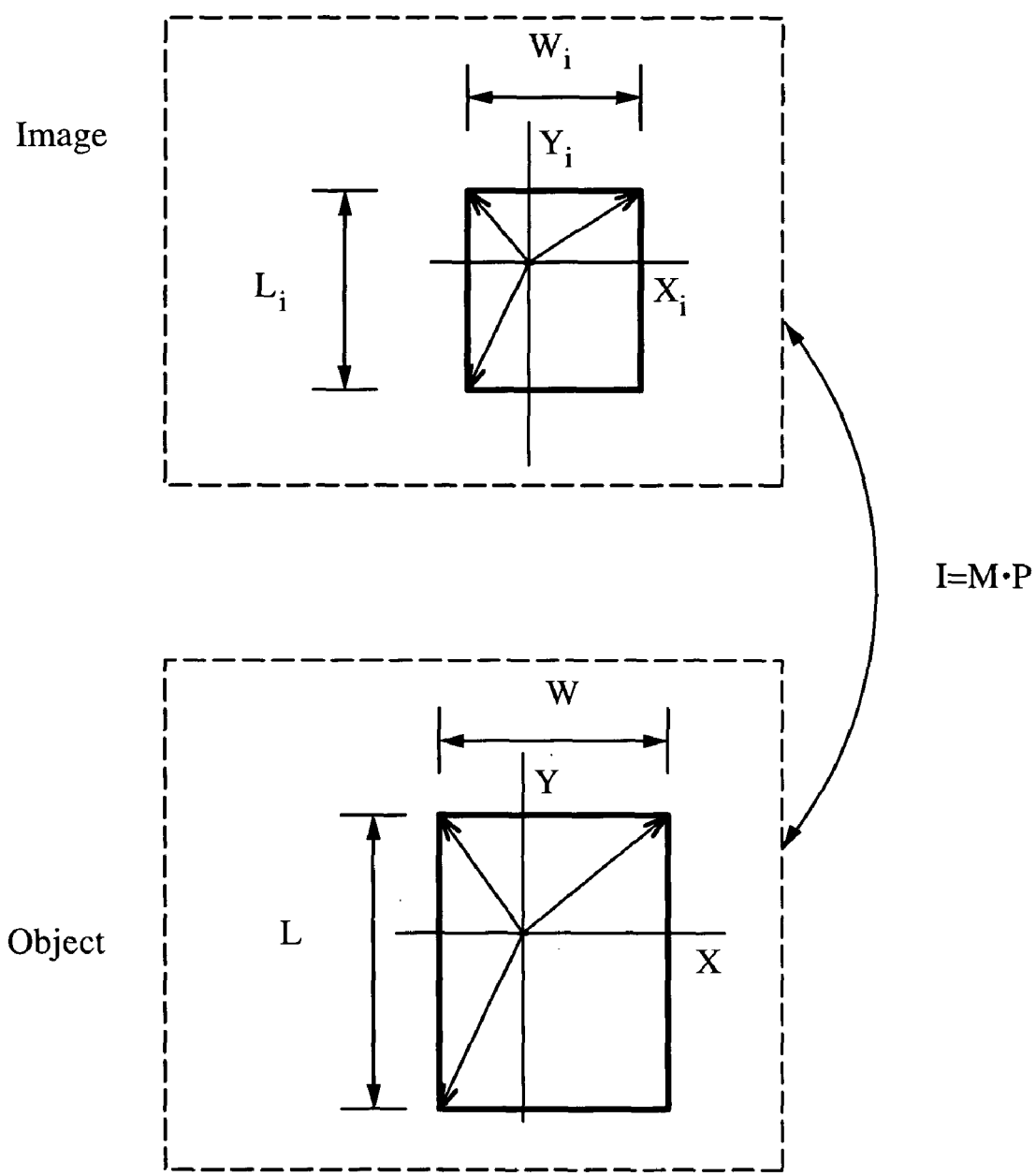
FIG. 12 is a diagram illustrating a correspondence between the image of the jotting surface and the physical jotting surface as can be used for initialization and cross-check purposes.

These values can be obtained from the vectors and the scaling factor due to the magnification M of imaging optics 46 can be used, as shown in FIG. 12 as an additional cross-check and constraint to ensure that the values obtained are correct.

Figure 13:
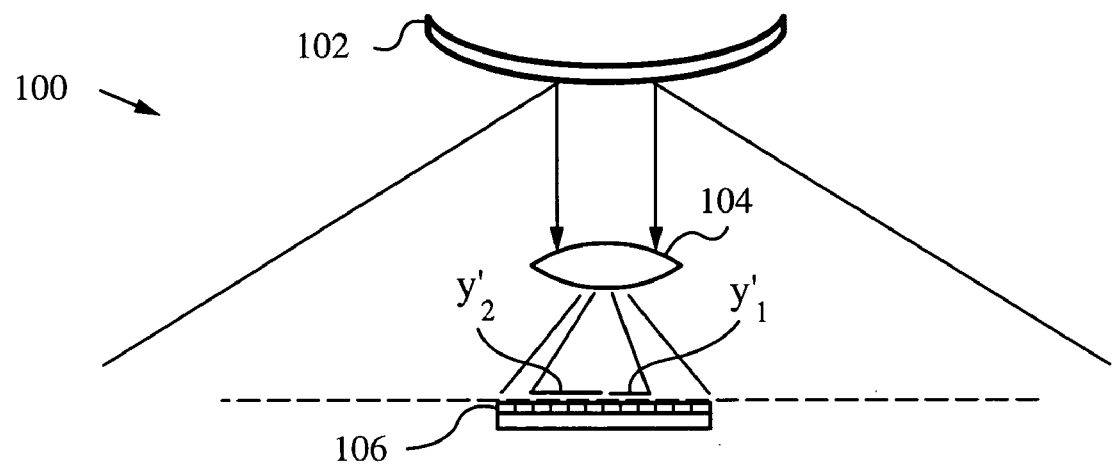
FIG. 13 illustrates another embodiment of an optical unit using a catadioptric system.
Figure 14:
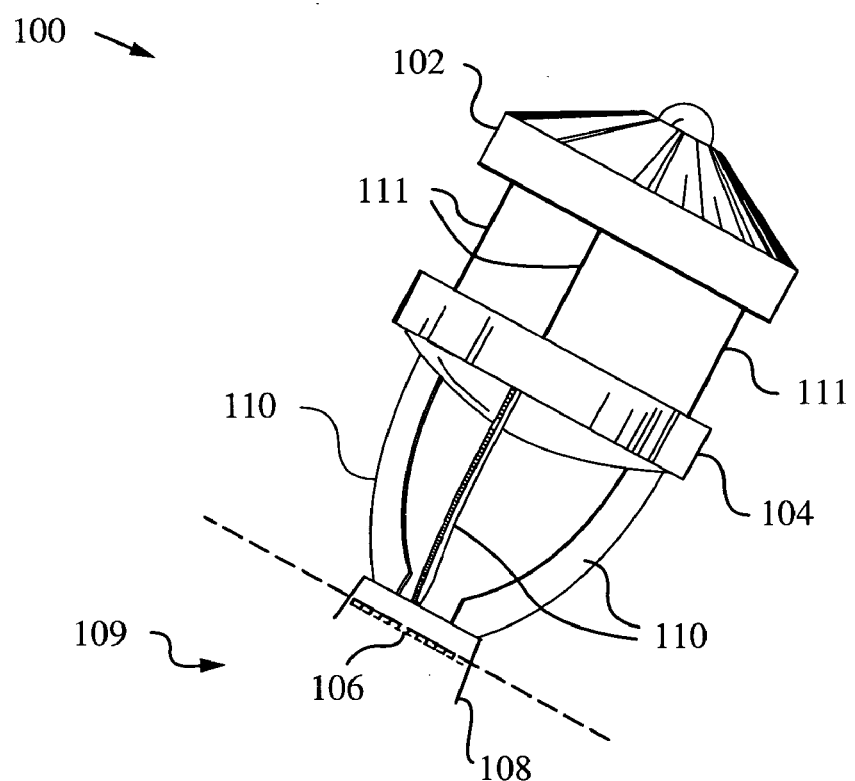
FIG. 14 illustrates the top portion of a writing implement employing the catadioptric system of FIG. 13.

Jotting implements according to the invention admit of numerous other embodiments. For example, an alternative optical unit 100 employing a catadioptic system with a parabolic (or hyperbolic) mirror 102 and a lens 104 is shown in FIG. 13. The construction of optical unit 100 has to be altered to accommodate optical unit 100 on a jotting implement 108 (only top part shown) as in FIG. 14. In this embodiment a photodetector array 106 is placed at a distal end 109 of a jotting implement 108. Support members 110 are extended with extensions 111 in this embodiment.

Figure 15:
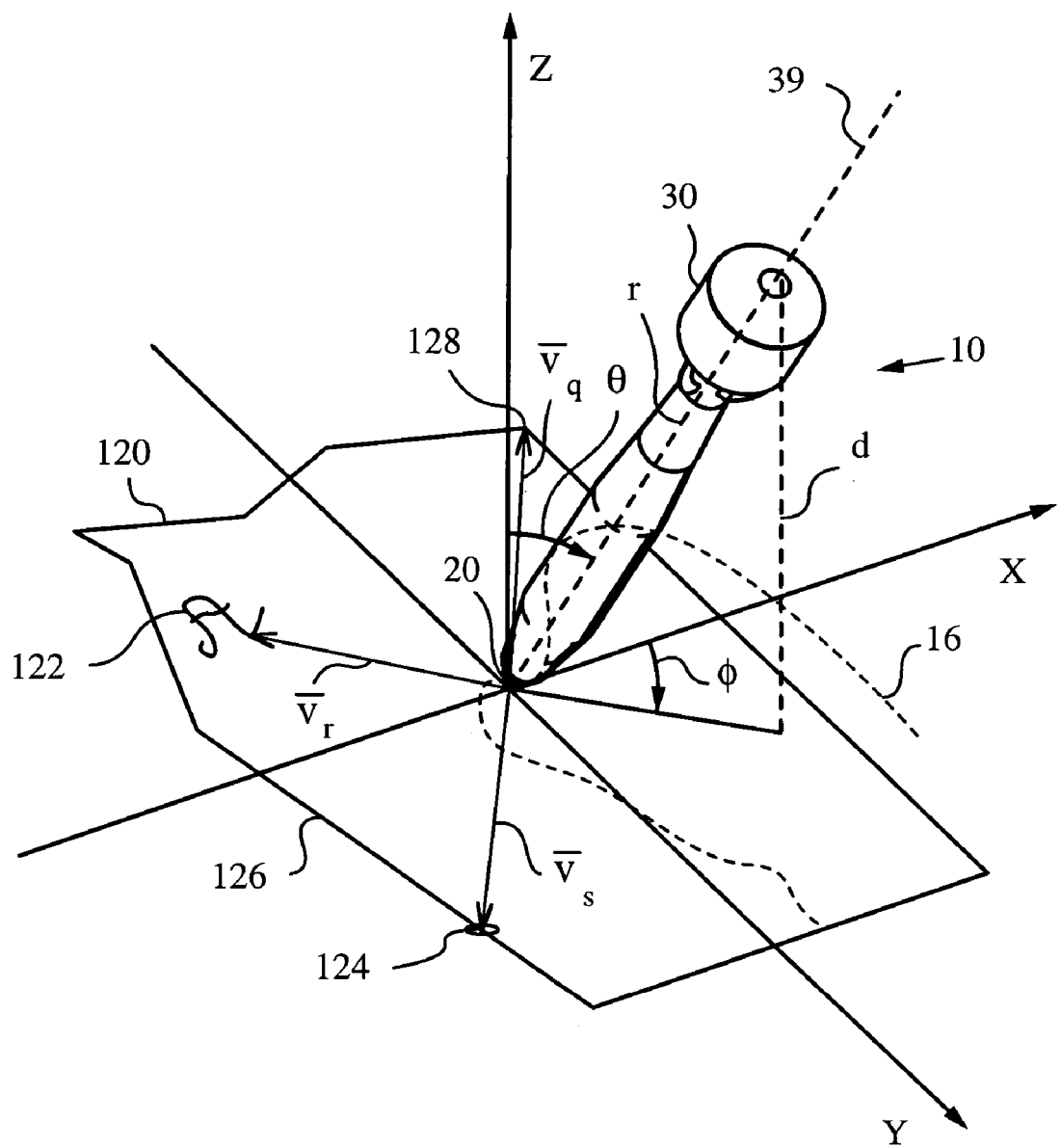
FIG. 15 is a three-dimensional diagram illustrating the use of alternative landmarks and features to determine the physical coordinates of the nib.

Jotting implement 10 can take advantage of features and landmarks other than corners and edges of a jotting surface 120. For example, as shown in FIG. 15, jotting implement takes advantage of a feature 122 produced by the user. Feature 122 is in fact a letter "A" written by the user. In the present case a particularly easy-to-locate point on the letter (e.g., a point yielding high contrast for easy detection and tracking) is used for tracking and a vector $v_r$ is constructed to this point from the origin of the Cartesian coordinate system. Jotting implement 10 also takes advantage of a landmark 124 located along an edge 126. A vector $v_s$ is constructed to landmark 124 from the origin. Finally, implement 10 uses a corner 128 of jotting surface 120 identified by corresponding vector $v_q$.

In this embodiment, during operation, edge detection algorithms described above and any other algorithms for detecting high-contrast points are applied to localize the lines and corners in the image and locate feature 122, landmark 124 and corner 128. Then, angles θ, φ are determined and the corresponding transformations applied to imaged vectors $v'_q$, $v'_r$ and $v'_s$ of the image of jotting surface 120, as described above. The physical coordinates of nib 20 are determined from the transformed vectors.

Of course, a person skilled in the art will recognize that the number of features and landmarks tracked will generally improve the accuracy of determining physical coordinates of nib 20 on jotting surface 120. Thus, the more landmarks and features are tracked, the more processing effort will be required. If real-time operation of jotting implement 10 is required, e.g., in cases where the jotting action is transmitted from jotting implement 10 to a receiver in real time, the number of features and landmarks should be limited. Alternatively, if the information jotted down can be downloaded by the user at a later time and/or no real-time processing is required, then more landmarks and features can be used to improve the accuracy with which the physical coordinates of nib 20 are determined. This will generally lead to an improved resolution of jotting surface 120. It should also be kept in mind, that the features and landmarks have to provide absolute references, i.e., their positions on jotting surface 120 can not change in time. However, it should be remembered that the landmarks or features being used for determining the physical coordinates of nib 20 need not be the same from frame to frame.

It will be evident to a person skilled in the art that the present invention admits of various other embodiments.

The invention claimed is:

1. A jotting implement for inferring hand-jotted information from a jotting surface, said jotting implement comprising:
    a) a nib for jotting;
    b) a means for determining when said nib is jotting on said jotting surface;
    c) an optical unit for viewing said jotting surface, said optical unit being indexed to said nib; and
    d) a processing unit for receiving optical data of said jotting surface from said optical unit and for determining from said optical data physical coordinates of said nib with respect to at least one corner of said jotting surface and at least one edge of said jotting surface.

2. The jotting implement of claim 1, wherein said optical unit is an imaging unit for producing an image of said jotting surface.

3. The jotting implement of claim 2, wherein said imaging unit further comprises a photodetector array whereon said image of said jotting surface is projected.

4. The jotting implement of claim 3, wherein said processing unit further comprises an edge detection unit for detecting edges and corners of said jotting surface in said image.

5. The jotting implement of claim 3, further comprising an image transformation unit for applying at least one transformation to said image.

6. The jotting implement of claim 5, wherein said image transformation unit comprises an image deformation transformer based on a plane projection.

7. The jotting implement of claim 5, wherein said image transformation unit comprises an image deformation transformer based on a spherical projection.

8. The jotting implement of claim 5, wherein said image transformation unit comprises an image transformer for determining Euler angles of said jotting implement with respect to said jotting surface.

9. The jotting implement of claim 3, wherein said photodetector array is a CMOS photodetector array.

10. The jotting implement of claim 2, wherein said imaging unit produces a perspective projection of said jotting surface.

11. The jotting implement of claim 10, wherein at least one angle associated with an orientation of said jotting implement with respect to said jotting surface is determined from said perspective projection.

12. The jotting implement of claim 11, wherein said at least one angle comprises an inclination angle $\theta$ and a polar angle $\phi$.

13. The jotting implement of claim 2, wherein said processing unit further comprises a ratio computation module for determining said physical coordinates from said image.

14. The jotting implement of claim 2, wherein said imaging unit comprises refractive imaging optics.

15. The jotting implement of claim 14, wherein said refractive imaging optics have a field of view substantially larger than an area of said jotting surface.

16. The jotting implement of claim 2, wherein said imaging unit comprises reflective imaging optics.

17. The jotting implement of claim 16, wherein said reflective imaging optics have a field of view substantially larger than an area of said jotting surface.

18. The jotting implement of claim 2, further comprising a frame control for imaging said jotting surface at a predetermined frame rate.

19. The jotting implement of claim 1, wherein said means for determining when said nib is jotting is selected from the group of strain gauges, mechanical pressure sensors, piezoelectric elements.

20. The jotting implement of claim 1, further comprising a means for communicating said physical coordinates with an external unit.

21. The jotting implement of claim 1, further comprising a means for initializing and recognizing said jotting surface.

22. The jotting implement of claim 1, wherein said optical unit is mounted on a distal end of said jotting implement.

23. A jotting implement for inferring information from a jotting surface, said jotting implement comprising:
　a) a jotting end having a nib for jotting;
　b) a means for determining when said nib is jotting on said jotting surface;
　c) a distal end having an optical unit for viewing said jotting surface, said optical unit being indexed to said nib; and
　d) a processing unit for receiving optical data of said jotting surface from said optical unit and for determining from said optical data physical coordinates of said nib with respect to at least two corners of said jotting surface.

24. A jotting implement for optically capturing handwritten information from a jotting surface, said jotting implement comprising:
　a) a jotting end having a nib for jotting;
　b) a means for determining when said nib is jotting on said jotting surface;
　c) a distal end having an optical unit for viewing said jotting surface, said optical unit being indexed to said nib; and
　d) a processing unit for receiving optical data of said jotting surface from said optical unit and for determining from said optical data physical coordinates of said nib with respect to at least two landmarks on said jotting surface.

25. The jotting implement of claim 24, wherein said at least two landmarks are markings created by a user on said jotting surface.

26. The jotting implement of claim 25, wherein said markings comprise hand-jotting of said user.

27. The jotting implement of claim 24, wherein said landmarks further comprise data about said jotting surface.

28. The jotting implement of claim 27, wherein said jotting surface comprises a sheet of paper and said data indicates a size of said sheet of paper.

29. A jotting implement for inferring hand-jotted information from a jotting surface, said jotting implement comprising:
　a) a nib for jotting;
　b) a means for determining when said nib is jotting on said jotting surface;
　c) an optical unit for viewing said jotting surface, said optical unit being indexed to said nib; and
　d) a processing unit for receiving optical data of said jotting surface from said optical unit and for determining from said optical data physical coordinates of said nib with respect to at least two corners of said jotting surface.

* * * * *